Dec. 9, 1958   F. C. KERCHER, SR   2,863,254
FISHING LINE BOBBER
Filed Dec. 16, 1957
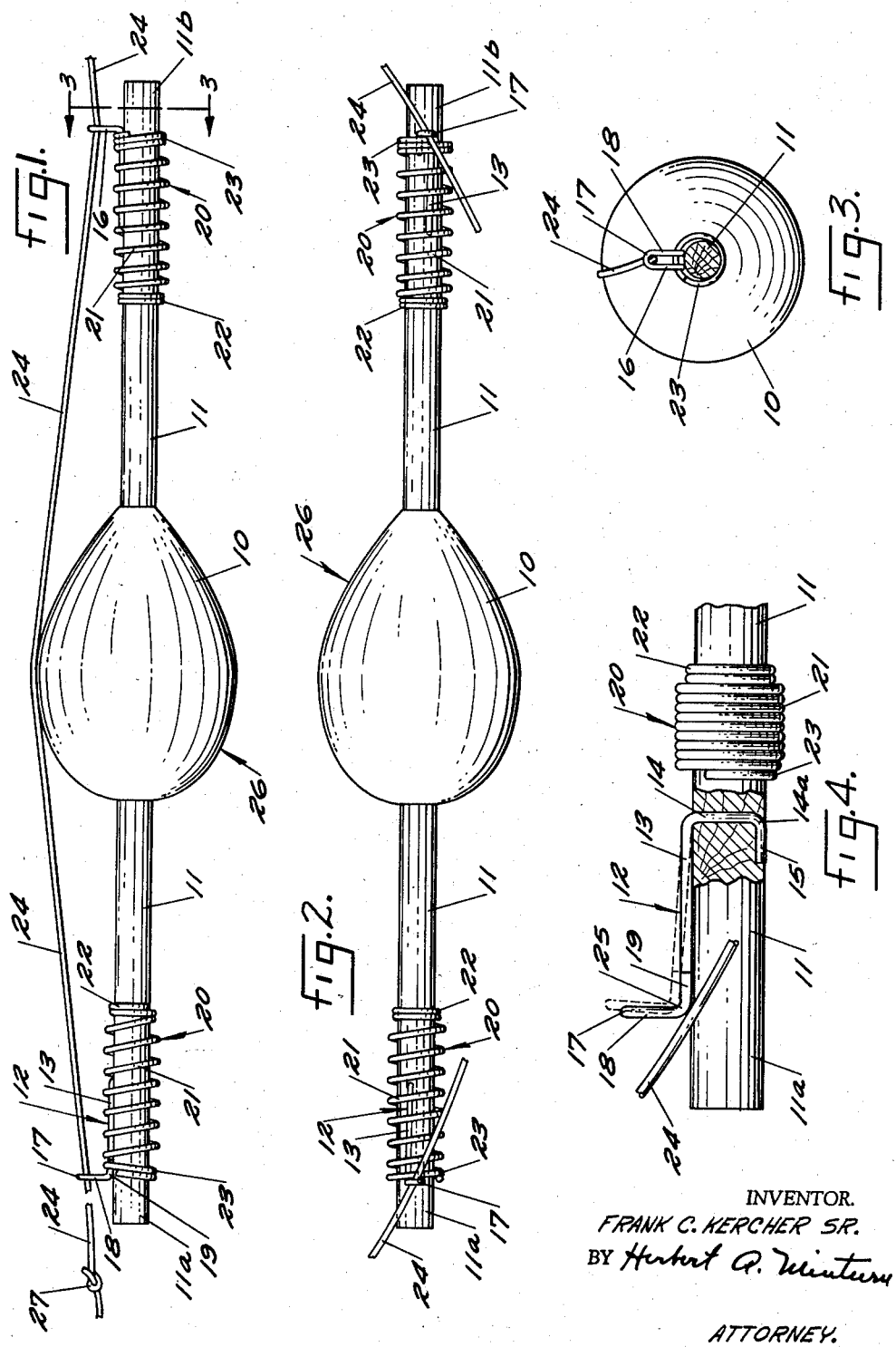
INVENTOR.
FRANK C. KERCHER SR.
BY Herbert Q. Minturn
ATTORNEY.

United States Patent Office 2,863,254
Patented Dec. 9, 1958

2,863,254

FISHING LINE BOBBER

Frank C. Kercher, Sr., Indianapolis, Ind.

Application December 16, 1957, Serial No. 703,061

3 Claims. (Cl. 43—44.94)

This invention relates to a fishing line bobber used in still fishing, and the primary purpose of the invention is to provide means for securing the bobber to a line to provide for variable lengths of line to extend from the bobber down to the sinker and hook, so that the depth of the hook may be regulated at desired elevations above the bottom of the water being fished.

A further primary object of the invention is to provide line attaching means permitting the line to be readily attached to the bobber and also readily released therefrom.

The invention provides an extremely simple and yet durable and most effective construction for the purposes above indicated.

One particular form of the invention is described in reference to the accompanying drawing, in which—

Fig. 1 is a view in side elevation of a structure embodying the invention;

Fig. 2 is a view in side elevation of the structure revolved 90 degrees from the position shown in Fig. 1;

Fig. 3 is a view in transverse section on the line 3—3 in Fig. 1; and

Fig. 4 is a detail in side elevation on an enlarged scale and partial section of the line securing means.

The customary bobber is shown herein as comprising the bulbous float 10 through which extends axially a stem 11. The stem 11 extends by substantially equal lengths from both the top and bottom ends of the float 10.

Each stem end 11a and 11b is provided with a line securing mechanism, identical in each instance, and therefore the description of the securing means for one end will be sufficient for describing the like means at the other end.

Referring to the end 11a for example, there is a spring wire member generally designated by the numeral 12. This member 12 has a major length 13 extending along the surface of the stem 11, and turns at right angles to pass diametrically through the stem 11 by a length 14, and the merging end 14a is extended into a short foot 15 which is sunk into the stem 11, Fig. 4. By reason of the foot 15 thus engaging the stem 11, the major length 13 is held in snug contact with the opposite side of the stem 11.

The length 13 extends from the transverse length 14 toward the end 11a and at a short distance therefrom turns approximately radially from the stem 11 to form an arm 16, and thence bends around from an outer portion thereof to form a loop 17, Fig. 3, and back by an arm length 18 to the stem 11, and finally into a foot 19 which extends along the stem 11 a short distance in parallel relation to the length 13. The foot 19 is held in contact normally with the stem 11 by reason of the elasticity of the length 13 as before indicated, bending toward the stem 11 from the transverse length 14.

A coil spring 20 has a plurality of turns 21 surrounding the stem 11. One end of the spring 20 has one or more turns 22 of reduced diameter frictionally engaging around the stem 11 at a spaced distance from the transverse wire length 14 toward the float 10. The opposite end of the spring 20 is preferably provided with a pair of side by side turns 23 of substantially the same diameter as is the diameter of the turns 21. The turns 22 fixedly engage the spring 20 on stem 11 as described, and normally the turns 21 will elastically urge the turns 23 outwardly along the stem 11 toward the end 11a to carry those end turns 23 over the wire length 13 and into abutment with the arms 16 and 18 with the foot 19 within those turns, as best indicated in Fig. 1. The diameter of the turns 21 and 23 is the same, and is such that the length 13 is held snugly against the stem 11 by reason of the opposite sides of those turns being pressed against the stem 11.

The spring 20 is readily manipulated by one's thumb and forefinger to be retracted to a position as indicated in Fig. 4 whereby all of the turns including turns 21 and 23 will be removed from over the wire length 13. In this position of the spring 20, a line 24 is inserted around a bend 25 between the arm 18 and the foot 19 so that the line 24 may lift the foot 19 to permit the line 24 to be pulled thereunder and into the space between the arms 16 and 18, whereupon the elasticity of the member 13 will cause the foot 19 to return again into contact with the stem 11. This operation is repeated at the opposite end portion of the stem 11, that is, toward the end 11b, so that the line 24 is then carried freely between both sets of arms 16 and 18, one set at each end of the stem 11. After the line 24 has thus been inserted under the foot 19 into the space between the arms 16 and 18, the spring 20 may be released so as to carry the end turns 23 along over the wire length 13 to come into abutment with the arms 16 and 18, encircling both the wire 13 and the foot 19 adjacent the arms 16 and 18.

With the line 24 thus positioned, the bobber generally designated by the numeral 26 is free to travel along the line 24. To limit this travel, a knot 27 may be formed in the line 24 so that upon the knot 27 striking the arms 16 and 18 at what would be the normally upper end of the bobber, end 11a, the length of the line is thus limited which will extend below the bobber. By placing the knot 27 at varying positions along the length of the line, the free length of the line below the bobber is thus likewise varied.

The line 24 may be readily disengaged from the bobber 26 by retracting the spring 20 to some such position as indicated in Fig. 4, whereupon the line may be pulled around from the sides of the arms 16 and 18 toward the end of the stem 11, 11a for example, to pull the line back toward the bobber float 10 under the foot 19 which may be sprung upwardly from the stem 11 thereby, and the same process repeated at the line engaging mechanism at the other end 11b. Thus, the bobber may be removed from the line 24 at will, and the knot 27, if desired, may be left in the line for future use after the water depth has been determined for the proper and desired positioning of the hook at the lower end.

While I have herein shown and described my invention in the one particular form, it is obvious that changes may be employed without departing from the spirit of the invention, and I therefore do not desire to be limited to that precise form beyond the limitations which may be imposed by the following claims.

I claim:

1. A bobber having free running line attaching means comprising in combination a float body having upper and lower stem portions extending therefrom and having free ends, an elastic wire member for each of said stem portions comprising a major length lying along and in approximate parallelism with each of their respective stem portions, a transverse length extending from one end of the major length approximately diametrically through their respective stem from one side and terminating in a foot at the opposite side of their respective stem and retaining the major length along the stem; each of said wire members having an arm outturned therefrom adjacent the free end of their respective stem portion, each of said arms merging into a loop and thence toward their respective stem into a second arm spaced from the first arm, each of said second arms extending back toward their respective stem portion, through a rounded bend and finally into a foot extending along their respective stem portion parallel to said major length; and a coil spring for each of said stem portions, each of said coil springs surrounding their respective stem portion and fixedly engaged at one end to their respective stem portion between one end of said wire member major length and said float body, and normally overlying their respective wire member major length and said foot; and a line connected to said attaching means; each foot being adapted to be yieldingly lifted from their respective stem portion upon their respective spring being retracted from over the foot to receive said line thereunder for entrance between the two arms into said loop to travel freely therethrough; said line having an abutment limiting said travel.

2. A bobber having free running line attaching means comprising a stem; a spring wire length lying normally along the stem in longitudinal alignment therewith; means securing one end of said length fixedly to said stem; a loop carried by said length at a distance from said one end thereof and extending laterally outwardly from said stem, said loop being open toward said stem; a coil spring surrounding said stem and having one end fixed to said stem adjacent said wire length end, the spring normally extending by a free end from its fixed end over said wire length and closing off said loop; said spring being contractible to allow said loop to be lifted away from said stem against the resistance to bending of said wire length to provide an entrance for said line into said loop and to close the side of the loop adjacent said stem upon release of the spring, thereby retaining the line in free travel through the loop.

3. The structure of claim 2 in which said loop is defined by an inverted U-shaped bend in said wire length comprising a pair of spaced apart arms, and a rounded portion interconnecting the arms remotely from said stem, one arm extending directly from said wire length and the other arm directed from said rounded portion in spaced relation to said one arm toward said stem, and a foot extending from said other arm normally along said stem and within said spring.

References Cited in the file of this patent

UNITED STATES PATENTS

| | | |
|---|---|---|
| 791,290 | Robertson | May 30, 1905 |
| 844,182 | Pettis | Feb. 12, 1907 |
| 1,152,755 | Perron | Sept. 7, 1915 |
| 2,163,483 | Carlisle | June 20, 1939 |
| 2,748,524 | Schinzel | June 5, 1956 |